(12) United States Patent
Ayirala et al.

(10) Patent No.: US 10,287,486 B2
(45) Date of Patent: *May 14, 2019

(54) OIL RECOVERY PROCESS USING AN OIL RECOVERY COMPOSITION OF AQUEOUS SALT SOLUTION AND DILUTE POLYMER FOR CARBONATE RESERVOIRS

(71) Applicant: Saudi Arabian Oil Company, Dhahran (SA)

(72) Inventors: Subhash Chandrabose Ayirala, Dhahran (SA); Ali Abdallah Al-Yousef, Dhahran (SA); Abdulkareem M. Al-Sofi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,062

(22) Filed: Sep. 24, 2018

(65) Prior Publication Data

US 2019/0023974 A1 Jan. 24, 2019

Related U.S. Application Data

(60) Continuation-in-part of application No. 15/903,952, filed on Feb. 23, 2018, now Pat. No. 10,106,726, (Continued)

(51) Int. Cl.
*E21B 43/20* (2006.01)
*C09K 8/588* (2006.01)
*C08K 3/00* (2018.01)

(52) U.S. Cl.
CPC ............... *C09K 8/588* (2013.01); *C08K 3/00* (2013.01); *E21B 43/20* (2013.01)

(58) Field of Classification Search
CPC ............ C09K 8/588; C09K 3/00; E21B 42/20
See application file for complete search history.

(56) References Cited

U.S. PATENT DOCUMENTS 3,330,343 A 7/1967 Tosch et al.
3,346,047 A 10/1967 Townsend et al.
(Continued)

FOREIGN PATENT DOCUMENTS

CN 103242818 A 8/2013
CN 103965852 A 8/2014
(Continued)

OTHER PUBLICATIONS

Alzayer, et al. "Numerical simulation of improved heavy oil recovery by low-salinity water injection and polymer flooding." SPE 165287, SPE Saudi Arabia section technical symposium and exhibition. Society of Petroleum Engineers, 2013; pp. 1-13.
(Continued)

*Primary Examiner* — Silvana C Runyan
(74) *Attorney, Agent, or Firm* — Bracewell LLP; Constance G. Rgebergen; Brian H. Tompkins

(57) ABSTRACT

An oil recovery composition of an aqueous solution of one or more salts and dilute polymer and processes for enhanced oil recovery using the oil recovery composition are provided. An oil recovery composition may include an aqueous solution of one or more salts having a salinity of about 4000 parts-per-million (ppm) total dissolved solids (TDS) to about 8000 ppm TDS, a polymer having a concentration of 250 ppm to 500 ppm, metal oxide nanoparticles of up to 0.1 weight (wt) %, and dissolved $CO_2$. The one or more salts may include at least one of sodium chloride (NaCl), calcium chloride (CaCl2), magnesium chloride (MgCl2), sodium sulfate (Na2SO4) and magnesium sulfate (MgSO4). The polymer may include a copolymer of acrylamide and acrylamido tertiary butyl sulfonate (ATBS). The oil recovery
(Continued)

compositions provided may be suited for enhancing oil recovery in carbonate reservoirs having in situ oil viscosities less than 3 centipoise (cP).

12 Claims, 9 Drawing Sheets

Related U.S. Application Data which is a division of application No. 15/358,435, filed on Nov. 22, 2016.

(60) Provisional application No. 62/280,446, filed on Jan. 19, 2016.

(56) References Cited

U.S. PATENT DOCUMENTS

| | | | |
|---|---|---|---|
| 3,508,612 | A | 4/1970 | Reisberg et al. |
| 3,687,199 | A | 8/1972 | Jennings |
| 3,827,499 | A | 8/1974 | Norton et al. |
| 3,908,764 | A | 9/1975 | Harvey |
| 4,008,767 | A | 2/1977 | Waite |
| 4,050,513 | A | 9/1977 | Wu |
| 4,137,182 | A | 1/1979 | Golinkin |
| 4,630,678 | A | 12/1986 | Mumallah |
| 4,762,178 | A | 8/1988 | Falls et al. |
| 4,785,028 | A | 11/1988 | Hoskin |
| 4,915,170 | A | 4/1990 | Hoskin |
| 6,325,147 | B1 | 12/2001 | Doerler et al. |
| 7,581,594 | B2 | 9/2009 | Tang |
| 8,191,416 | B2 | 6/2012 | Kuchuk |
| 8,230,922 | B2 | 7/2012 | Pich |
| 8,439,111 | B2 | 5/2013 | Collins et al. |
| 8,550,163 | B2 | 10/2013 | Al-Yousif et al. |
| 8,550,164 | B2 | 10/2013 | Al-Yousef |
| 8,869,892 | B2 | 10/2014 | Pone |
| 2006/0027363 | A1 | 2/2006 | Shpakoff et al. |
| 2010/0078168 | A1 | 4/2010 | Jackson et al. |
| 2011/0306525 | A1 | 12/2011 | Lighthelm et al. |
| 2012/0125605 | A1 | 5/2012 | Willingham et al. |
| 2013/0081822 | A1 | 4/2013 | Han et al. |
| 2013/0125630 | A1 | 5/2013 | Collins |
| 2013/0274149 | A1 | 10/2013 | Lafitte |
| 2014/0262275 | A1 | 9/2014 | Dean et al. |
| 2014/0326458 | A1 | 11/2014 | Favero et al. |
| 2014/0345862 | A1 | 11/2014 | Jerauld et al. |
| 2015/0233222 | A1 | 8/2015 | Teklu et al. |
| 2017/0058186 | A1* | 3/2017 | Oghena .................. C09K 8/58 |
| 2017/0058187 | A1* | 3/2017 | Mansour .............. C09K 8/584 |

FOREIGN PATENT DOCUMENTS

| | | |
|---|---|---|
| GB | 1484153 A | 9/1977 |
| JP | 2011046612 A | 3/2011 |
| WO | 2008029131 A1 | 3/2008 |
| WO | 2010092097 A1 | 8/2010 |
| WO | 2011113470 A1 | 9/2011 |
| WO | 2013091023 A2 | 6/2013 |
| WO | 2013156866 A2 | 10/2013 |

OTHER PUBLICATIONS

Austad, Tor. "Water-based EOR in carbonates and sandstones: new chemical understanding of the EOR potential using smart water." Enhanced oil recovery Field case studies (2013); pp. 1-49.
Awolayo, et al. "An Experimental Investigation into the Impact of Sulfate Ions in Smart Water to Improve Oil Recovery in Carbonate Reservoirs." Transport in Porous Media 111.3 (2016); pp. 649-668.
Ayirala et al., "A Designer Water Process for Offshore Low Salinity and Polymer Flooding Applications", SPE 129926, SPE Improved Oil Recovery Symposium held in Oklahoma, 2010; pp. 1-12.
Hassenkam et al., "A Fast Alternative to Core Plug Tests for Optimizing Injection Water Salinity for EOR" SPE 169136-MS, SPE Improved Oil Recovery Symposium held in USA, Apr. 2014; pp. 1-15.
Hosseini, S. N., et al. "Brine Ions and Mechanism of Low Salinity Water Injection in Enhanced Oil Recovery: A Review." Research Journal of Applied Sciences, Engineering and Technology 11.11 (2015); pp. 1257-1264.
International Search Report and Written Opinion for related PCT application PCT/US2017/014097 (SA5516/PCT) dated Mar. 16, 2017; pp. 1-16.
International Search Report and Written Opinion for related PCT application PCT/US2017/014099 (SA5449/PCT) dated Mar. 10, 2017; pp. 1-14.
Kumar, et al., "Atomic Force Microscopy Study of Wettability Alteration," SPE International Symposium on Oilfield Chemistry, The Woodlands, TX, Feb. 2005; pp. 137-145.
Kwak, et al. "New insights on the role of multivalent ions in water-carbonate rock interactions." SPE Improved Oil Recovery Symposium. Society of Petroleum Engineers, Saudi Aramco Journal of Technology 2014; pp. 1-14.
Lashkarbolooki et al., "Effect of Salinity, Resin and Asphaltene on the Surface Properties of Acidic Crude Oil/Smart Water/Rock System", Energy & Fuels Oct. 23, 2014; pp. 1-42.
Lashkarbolooki, et al. "The Impacts of Aqueous Ions on Interfacial Tension and Wettability of an Asphaltenic-Acidic Crude Oil Reservoir during Smart Water Injection." Journal of Chemical & Engineering Data 59.11 (2014); pp. 1-11.
Mohammadi et al., "Mechanistic Modeling of the Benefit of Combining Polymer with Low Salinity Water for Enhanced Oil Recovery" SPE 153161, SPE Improved Oil Recovery Symposium held in Oklahoma, 2012; pp. 1-11.
Qiao, C. et al. "A Mechanistic Model for Wettability Alteration by Chemically Tuned Waterflooding in Carbonate Reservoirs." SPE 170966, SPE Journal (2015); pp. 1-25.
Rezaeidoust, A., et al. "Smart Water as Wettability Modifier in Carbonate and Sandstone: A Discussion of Similarities/Differences in the Chemical Mechanisms." Energy & fuels 2009, 23; pp. 4479-4485.
Sharifpour, et al. "Smart Technique in Water Shutoff Treatment for a Layered Reservoir through an Engineered Injection/Production Scheme." Industrial & Engineering Chemistry Research 54.44 (2015); pp. 1-12.
Shiran et al., "Enhanced Oil Recovery (EOR) by Combined Low Salinity Water / Polymer Flooding", ACS Energy & Fuels, American Chemical Society, vol. 27, 2013, pp. 1223-1235.
Suijkerbuijk et al., "The Development of a Workflow to Improve Predictive Capability of Low Salinity Response" IPTC 17157, International Petroleum Technology Conference held in China, 2013, pp. 1-11.
Suman et al. "Evaluation of Low Saline "Smart Water" Enhanced Oil Recovery in Light Oil Reservoirs". World Journal of Engineering and Technology, 2, (2014); pp. 13-22.
Vermolen et al., "Low Salinity Polymer Flooding: Improving Polymer Flooding Technical Feasibility and Economics by Using Low Salinity Make up Brine", IPTC 17342, International Petroleum Technology Conference held in Qatar, 2014; pp. 1-15.
Yousef et al., "Improved /Enhanced Oil Recovery from Carbonate Reservoirs by Tuning Injection Water Salinity and Ionic Content", SPE154076, Eighteenth SPE Improved Oil Recovery Symposium held in USA, Apr. 2012; pp. 1-18.
Yousef et al., "Laboratory Investigation of the Impact of Injection Water Salinity and Ionic Content on Oil Recovery From Carbonate Reservoirs" SPE137634, SPE Canadian Unconventional Resources and International Petroleum Conf. Canada, 2010; pp. 578-593.
Yousef, A. et al. "The impact of the injection water chemistry on oil recovery from carbonate reservoirs" SPE 154077, SPE EOR Conference at Oil and Gas West Asia. Society of Petroleum Engineers, 2012; pp. 1-14.
Zekri, A., et al. "An Experimental Investigation of Low Salinity Oil Recovery in Carbonate and Sandstone Formation" International Journal of Petroleum and Petrochemical Engineering (IJPPE); vol. 1, Issue 1, Jun. 2015, pp. 1-11.

(56) References Cited

OTHER PUBLICATIONS

Zhuoyan et al., "Evaluation of the Potential of High Temperature, Low Salinity Polymer Flood for the Gao-30 Reservoir in the Huabei Oilfield, China: Experimental and Reservoir Simulation Results", Offshore technology Conference held in Texas, 2015, Pages.

\* cited by examiner

OIL RECOVERY PROCESS USING AN OIL RECOVERY COMPOSITION OF AQUEOUS SALT SOLUTION AND DILUTE POLYMER FOR CARBONATE RESERVOIRS

CROSS-REFERENCE TO RELATED PATENT APPLICATIONS

This application is a continuation-in-part of and claims priority from U.S. Non-Provisional application Ser. No. 15/903,952, filed Feb. 23, 2018, and titled "OIL RECOVERY PROCESS USING AN OIL RECOVERY COMPOSITION OF AQUEOUS SALT SOLUTION AND DILUTE POLYMER FOR CARBONATE RESERVOIRS," which is a divisional of and claims priority from U.S. Non-Provisional application Ser. No. 15/358,435, filed Nov. 22, 2016, and titled "OIL RECOVERY PROCESS USING AN OIL RECOVERY COMPOSITION OF AQUEOUS SALT SOLUTION AND DILUTE POLYMER FOR CARBONATE RESERVOIRS," which claims priority from U.S. Provisional Application No. 62/280,446, filed Jan. 19, 2016, and titled "OIL RECOVERY PROCESS USING AN OIL RECOVERY COMPOSITION OF SMART WATER AND DILUTE POLYMER FOR CARBONATE RESERVOIRS," each of which are incorporated by reference in their entirety for purposes of United States patent practice.

BACKGROUND

Field of the Disclosure

Embodiments of the disclosure generally relate to formation treatment fluids and, more specifically, to enhanced oil recovery fluids.

Description of the Related Art

The use of enhanced oil recovery (EOR) processes has greatly benefited the oil and gas industry by increasing the production of problematic and underperforming hydrocarbon bearing wells and fields. The EOR processes used in modern oil and gas operations may include chemical, hydrochemical, thermal, fluid/superfluid and microbial based processes as well as the relatively recent plasma-pulse technology (PPT). Water injection (alternatively referred to as water flooding) has been widely used to increase the conductivity or flow of liquid hydrocarbons in subterranean reservoir treated using EOR techniques. The water source may be derived from freshwater, (for example, aquifers or surface water) as well as saltwater/brackish sources (for example, river/sea water mixtures).

SUMMARY

The use of water flooding processes known as "smart water flooding" or simply "smart flooding" may be used for EOR operations in carbonate reservoirs. Such water flooding processes involve an ion-based (that is, salt-based) modification to an injectable water fraction. In addition, such water flooding processes may be generally regarded as environmentally safe. Further such water flooding may improve microscopic sweep efficiency and release more oil from reservoir pores. However, such water flooding may be mobility constrained due to insufficient injection water viscosities, resulting in poor sweep efficiencies at the reservoir scale.

Embodiments of the disclosure generally relate to an oil recovery composition of an aqueous solution of one or more salts with a salinity of about 4,000 parts-per-million (ppm) to about 8,000 ppm, a dilute polymer, metal oxide nanoparticles, and dissolved carbon dioxide ($CO_2$) for improved oil recovery from a hydrocarbon containing carbonate reservoir formation. In one embodiment, an oil recovery composition is provided having an aqueous solution of one or more salts and having a salinity of 4,000 ppm to 8,000 ppm, a polymer having a concentration in the range of 250 ppm to less than 500 ppm, a plurality of metal oxide nanoparticles having a concentration in the range of 0.5 weight (wt) % to 0.1 wt %, and dissolved carbon dioxide ($CO_2$) in the aqueous solution. The one or more salts may include at least one of sodium chloride (NaCl), calcium chloride (CaCl2), magnesium chloride (MgCl2), sodium sulfate (Na2SO4) and magnesium sulfate (MgSO4). The aqueous solution may include at least 400 ppm sulfate ions and 300 ppm or less divalent cations including calcium, magnesium, or a combination thereof. In some embodiments, the oil recovery composition consists of the aqueous solution of one or more salts having a salinity of about 4,000 ppm to about 8,000 ppm, the polymer having a concentration of in the range of 250 ppm to less than 500 ppm, a plurality of metal oxide nanoparticles having a concentration in the range of 0.5 weight (wt) % to 0.1 wt %, and dissolved carbon dioxide in the aqueous solution.

In some embodiments, the aqueous solution of the oil recovery composition includes one or more ions of at least one of sodium, calcium, magnesium, sulfate, and chloride. In some embodiments, the polymer of the oil recovery composition is a copolymer of acrylamide and acrylamido tertiary butyl sulfonate (ATBS).

In another embodiment, a method for enhancing oil recovery in a hydrocarbon containing carbonate reservoir formation is provided. The method includes injecting a slug of an oil recovery composition into the reservoir formation. The oil recovery composition includes an aqueous solution of one or more salts and having a salinity of about 4,000 ppm to about 8,000 ppm, a polymer having a concentration in the range of 250 ppm to less than 500 ppm, a plurality of metal oxide nanoparticles having a concentration in the range of 0.5 weight (wt) % to 0.1 wt %, and dissolved carbon dioxide ($CO_2$) in the aqueous solution. The one or more salts of the aqueous solution include at least one of sodium chloride (NaCl), calcium chloride (CaCl2), magnesium chloride (MgCl2), sodium sulfate (Na2SO4) and magnesium sulfate (MgSO4). The aqueous solution may include at least 400 ppm sulfate ions and 300 ppm or less divalent cations including calcium, magnesium, or a combination thereof. The method further includes injecting a second solution into the carbonate reservoir formation after injecting the slug of the oil recovery composition. In some embodiments, the oil recovery composition consists of the aqueous solution of one or more salts having a salinity of about 4,000 ppm to about 8,000 ppm, the polymer having a concentration of in the range of 250 ppm to less than 500 ppm, a plurality of metal oxide nanoparticles having a concentration in the range of 0.5 weight (wt) % to 0.1 wt %, and dissolved carbon dioxide in the aqueous solution. In some embodiments, the metal oxide nanoparticles include silicon dioxide, aluminum oxide, or a combination thereof.

In some embodiments, the method includes recovering displaced hydrocarbon from the carbonate reservoir formation. In some embodiments, the aqueous solution includes one or more ions, the one or more ions including at least one of sodium, calcium, magnesium, sulfate, and chloride. In some embodiments, the slug of the oil recovery composition has a pore volume (PV) of at least 0.3 of the carbonate reservoir to be treated. In some embodiments, the second solution includes seawater. In some embodiments, the second solution includes the aqueous solution. In some embodiments, the aqueous solution is a first aqueous solution, the one or more salts are first one or more salts, and the second solution includes a second aqueous solution of one or more second salts suitable for enhancing oil recovery. In some embodiments, the polymer of the oil recovery composition includes a copolymer of acrylamide and acrylamido tertiary butyl sulfonate (ATBS). In some embodiments, injecting a second solution into the carbonate reservoir formation includes continuously injecting the second solution at an injection rate. In some embodiments, the carbonate reservoir formation has an in situ oil viscosity of less than 3 centipoise.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

The present disclosure will now be described more fully with reference to the accompanying drawings, which illustrate embodiments of the disclosure. This disclosure may, however, be embodied in many different forms and should not be construed as limited to the illustrated embodiments set forth in the disclosure. Rather, these embodiments are provided so that this disclosure will be thorough and complete, and will fully convey the scope of the disclosure to those skilled in the art.

As used in the disclosure, the term "smart water" refers to an aqueous solution of one or more salts suitable for enhancing oil recovery in carbonate reservoirs having a salinity in the range of about 4,000 parts-per-million (ppm) total dissolved solids (TDS) to about 8,000 ppm TDS (for example, about 5,000 ppm TDS to about 6,000 ppm TDS), such that the aqueous solution includes a concentration of one or more of the following ions suitable for enhancing oil recovery: sodium, calcium, magnesium, sulfate, and chloride ions. For example, a an aqueous solution may include one or more of the following salts suitable for enhancing oil recovery: sodium chloride (NaCl), calcium chloride ($CaCl_2$)), magnesium chloride ($MgCl_2$), sodium sulfate ($Na_2SO_4$) and magnesium sulfate ($MgSO_4$).

As used in the disclosure, "in situ" refers to an event or occurrence within a hydrocarbon reservoir including but not limited to methodologies, techniques and chemical reactions for enhancing hydrocarbon recovery from carbonate reservoirs. As used in the disclosure, the term "ppm" refers to parts-per-million by mass unless otherwise indicated.

Figure 1:
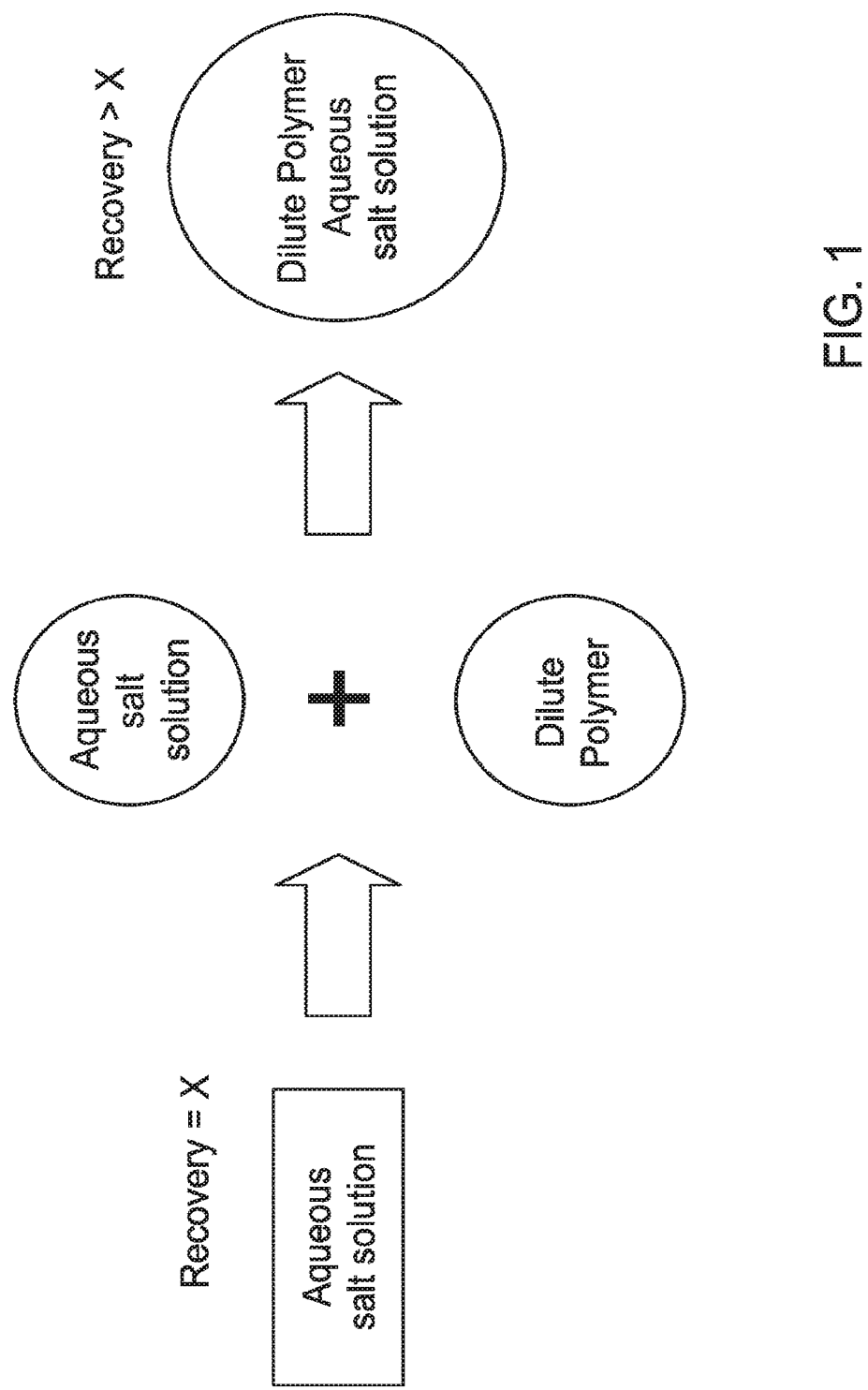
FIG. 1 is a schematic illustrating improved oil recovery from carbonate reservoirs using an oil recovery composition in accordance with an embodiment of the disclosure.

As shown in FIG. 1, embodiments of the disclosure include an oil recovery composition formed from an aqueous solution of one or more salts with a salinity of about 4,000 ppm to about 8,000 ppm (for example, about 5,000 ppm to about 6,000 ppm) and dilute polymer that has improved oil recovery performance (Recovery>X) over the oil recovery obtained using only the an aqueous solution of one or more salts (Recovery=X). The polymer concentrations in the oil recovery composition provide an increase in viscosity of the aqueous solution and thus provide mobility control and improve the macroscopic sweep efficiency at reservoir scale. These improvements add to the microscopic sweep efficiency obtained from the aqueous solution alone to significantly boost the oil recovery performance in carbonate reservoirs. Additionally, the lower salinities and specific ions (for example, sulfates) in the aqueous solution also increase the viscosifying characteristics of enhanced oil recovery polymers used. Accordingly, relatively greater viscosities can be achieved with such oil recovery compositions using the aqueous solutions described in the disclosure when compared to seawater used in typical water floods. Consequently, a greater oil recovery may be obtained as compared to conventional flooding compositions, resulting in improved economics (that is, lower cost) for oil recovery in carbonate reservoirs.

For example, in some embodiments an oil recovery composition may include an aqueous solution of one or more salts having a salinity of about 4,000 ppm TDS to about 8,000 ppm TDS (for example, about 5,000 ppm TDS to about 6,000 ppm TDS) and an anionic oil recovery polymer having a polymer concentration of about 250 ppm to about 500 ppm. In some embodiments, the oil recovery composition also includes metal oxide nanoparticles in an amount up to 0.1 weight (wt) %. In some embodiments, the oil recovery composition also includes dissolved carbon dioxide ($CO_2$). In some embodiments, the one or more salts may include at least one of: sodium chloride (NaCl), calcium chloride ($CaCl_2$), magnesium chloride ($MgCl_2$), sodium sulfate ($Na_2SO_4$) and magnesium sulfate ($MgSO_4$). In some embodiments, the aqueous solution of one or more salts may include at least one or more of the following ions: sodium, calcium, magnesium, or sulfates. In some embodiments, the polymer may be a copolymer of acrylamide and acrylamido tertiary butyl sulfonate (ATBS).

Embodiments of the disclosure also include processes for enhancing oil recovery in carbonate reservoirs using an oil recovery composition of an aqueous solution of one or more salts with a salinity of about 4,000 ppm TDS to about 8,000 ppm TDS (for example, about 5,000 ppm TDS to about 6,000 ppm TDS) and dilute polymer. In some embodiments, the oil recovery composition also includes metal oxide nanoparticles in an amount up to 0.1 weight (wt) %. In some embodiments, the oil recovery composition also includes dissolved carbon dioxide ($CO_2$). In some embodiments, a process for enhancing oil recovery may include injecting a small slug of an oil recovery composition of an aqueous solution of one or more salts with a salinity of about 4,000 ppm TDS to about 8,000 ppm TDS (for example, about 5,000 ppm TDS to about 6,000 ppm TDS), dilute polymer, metal oxide nanoparticles, and dissolved $CO_2$ having a pore volume (PV) of at least about 0.3 into a reservoir formation, followed by continuously injecting an aqueous solution of one or more salts having a salinity of about 4,000 ppm TDS to about 8,000 ppm TDS (for example, about 5,000 ppm TDS to about 6,000 ppm TDS) into the reservoir formation. In some embodiments, a process for enhancing oil recovery may include injecting a slug of an aqueous solution of one or more salts with a salinity of about 4,000 ppm TDS to about 8,000 ppm TDS (for example, about 5,000 ppm TDS to about 6,000 ppm TDS) and having a PV in the range of about 0.3 to about 0.5 of the reservoir formation, followed by injecting a slug of an oil recovery composition of the aqueous solution, a dilute polymer, metal oxide nanoparticles, and dissolved carbon dioxide ($CO_2$) having a PV of at least about 0.3 of the reservoir formation. After injecting the slug of the oil recovery composition, the process may include continuously injecting another aqueous solution of one or more salts or seawater into the reservoir formation or alternating from the former to the latter, and vice-versa.

The following examples are included to demonstrate embodiments of the disclosure. It should be appreciated by those of skill in the art that the techniques and compositions disclosed in the example which follows represents techniques and compositions discovered by the inventors to function well in the practice of the disclosure, and thus can be considered to constitute preferred modes for its practice. However, those of skill in the art should, in light of the present disclosure, appreciate that many changes can be made in the specific embodiments which are disclosed and still obtain a like or a similar result without departing from the spirit and scope of the disclosure.

In one non-limiting example, an oil recovery composition was formed using a first aqueous solution ("Aqueous Salt Solution 1") having a salinity of about 5761 ppm total dissolved solids (TDS) and having ion concentrations of 1,824 ppm sodium, 65 ppm calcium, 211 ppm magnesium, 429 ppm sulfates and 3,220 ppm chloride ions. In a second non-limiting example, an oil recovery composition was formed using a second aqueous solution ("Aqueous Salt Solution 2") having a salinity of about 5761 ppm TDS with an ion concentration of 1,865 ppm sodium and 3,896 ppm sulfates. Thus, Aqueous Salt Solution 1 includes calcium, magnesium, and sulfate ions and Aqueous Salt Solution 2 only includes sulfates. As explained further in the disclosure, the presence of ions such as calcium, magnesium, and sulfates may initiate interactions at the pore scale to further enhance oil recovery in a carbonate reservoir.

In one non-limiting example, a commercially available copolymer of acrylamide (AM) and acrylamido tertiary butyl sulfonate (ATBS, Flopaam AN-125 manufactured by SNF Floerger of Andrézieux, France (referred to as "AN-125" polymer), was added to each example aqueous solution in concentrations of 250 ppm, 500 ppm, and 750 ppm, and the viscosities of the modified aqueous solutions were measured at three different temperatures of 25° C., 40° C., and 60° C. and at a shear rate of 6.81 $sec^{-1}$. The measured viscosities of the modified aqueous solutions were compared to seawater (seawater having a salinity of about 57,610 ppm) viscosities at the same polymer concentration and temperature. The viscosities of Aqueous Salt Solution 1 and Aqueous Salt Solution 2 and their comparison with seawater viscosities at polymer concentrations of 0 ppm, 250 ppm, 500 ppm, and 750 ppm, and at the three different temperatures are shown in Tables 1-3. The percentage change summarized in these Tables indicate a percentage increase in the viscosities of the tested aqueous solutions when compared to seawater viscosity at the same polymer concentration:

TABLE 1

Seawater and Aqueous Solution Viscosities with Dilute Polymer at 25° C.

| Composition | 0 ppm | 250 ppm | % Change | 500 ppm | % Change | 750 ppm | % Change | Average |
|---|---|---|---|---|---|---|---|---|
| Seawater | 1.04 | 1.4 | 0.0 | 2.6 | 0.0 | 3.6 | 0.0 | 0.0 |
| Aqueous Salt Solution 1 | 0.96 | 1.9 | 35.7 | 3.4 | 30.8 | 4.2 | 16.7 | 27.7 |
| Aqueous Salt Solution 2 | 0.96 | 2.5 | 78.6 | 4.3 | 65.4 | 4.7 | 30.6 | 58.2 |

TABLE 2

Seawater and Aqueous Solution Viscosities with Dilute Polymer at 40° C.

| Composition | 0 ppm | 250 ppm | % Change | 500 ppm | % Change | 750 ppm | % Change | Average |
|---|---|---|---|---|---|---|---|---|
| Seawater | 0.88 | 1.1 | 0.0 | 2.1 | 0.0 | 2.9 | 0.0 | 0.0 |
| Aqueous Salt Solution 1 | 0.81 | 1.2 | 9.1 | 2.7 | 28.6 | 3.2 | 10.3 | 16.0 |
| Aqueous Salt Solution 2 | 0.81 | 1.9 | 72.7 | 3.3 | 57.1 | 3.7 | 27.6 | 52.5 |

TABLE 3

Seawater and Aqueous Solution Viscosities with Dilute Polymer at 60° C.

| Composition | 0 ppm | 250 ppm | % Change | 500 ppm | % Change | 750 ppm | % Change | Average |
|---|---|---|---|---|---|---|---|---|
| Seawater | 0.67 | 0.8 | 0.0 | 1.4 | 0.0 | 2.0 | 0.0 | 0.0 |
| Aqueous Salt Solution 1 | 0.62 | 0.9 | 12.5 | 20.0 | 42.9 | 2.4 | 20.0 | 25.1 |
| Aqueous Salt Solution 2 | 0.62 | 1.8 | 125.0 | 2.6 | 85.7 | 2.8 | 40.0 | 83.6 |

Figure 2:
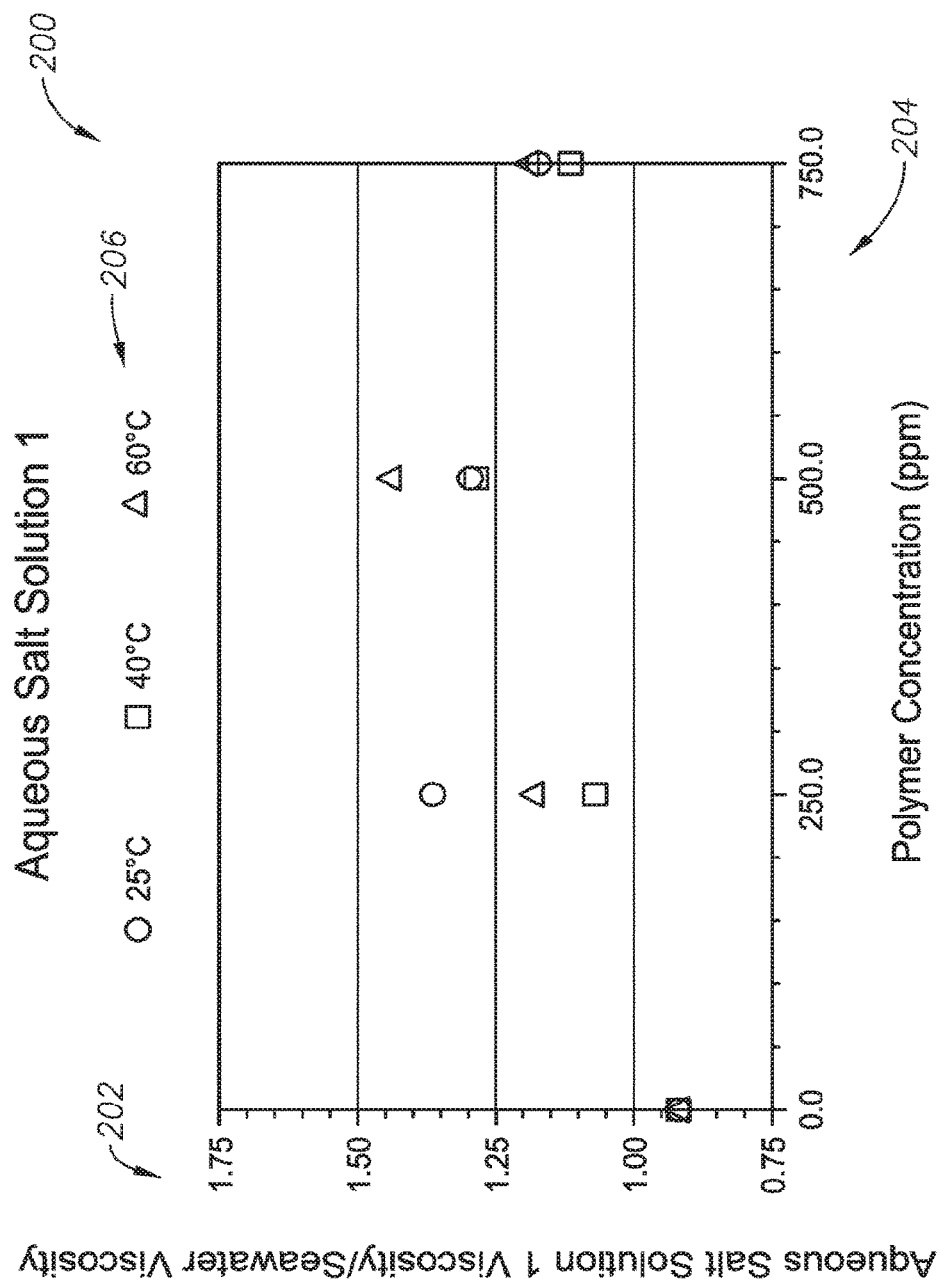
FIG. 2 is a plot of a ratio of aqueous salt solution viscosity over seawater viscosity vs polymer concentration in ppm for a first example aqueous salt solution in accordance with an embodiment of the disclosure.

FIG. 2 depicts a plot 200 illustrating the viscosity improvements of Aqueous Salt Solution 1 as compared to seawater at the various polymer concentrations of 250 ppm, 500 ppm, 750 ppm. As shown in FIG. 2, the Y-axis 202 corresponds to the ratio of tested aqueous solution viscosity over seawater viscosity, and the X-axis 204 corresponds to the polymer concentration in ppm. FIG. 2 depicts data points corresponding to a polymer concentration of 250 ppm, data points corresponding to a polymer concentration of 500 ppm, and data points corresponding to polymer concentrations of 750 ppm at the three different temperatures of 25° C., 40° C. and 60° C. (as indicated by the legend 206).

Figure 3:
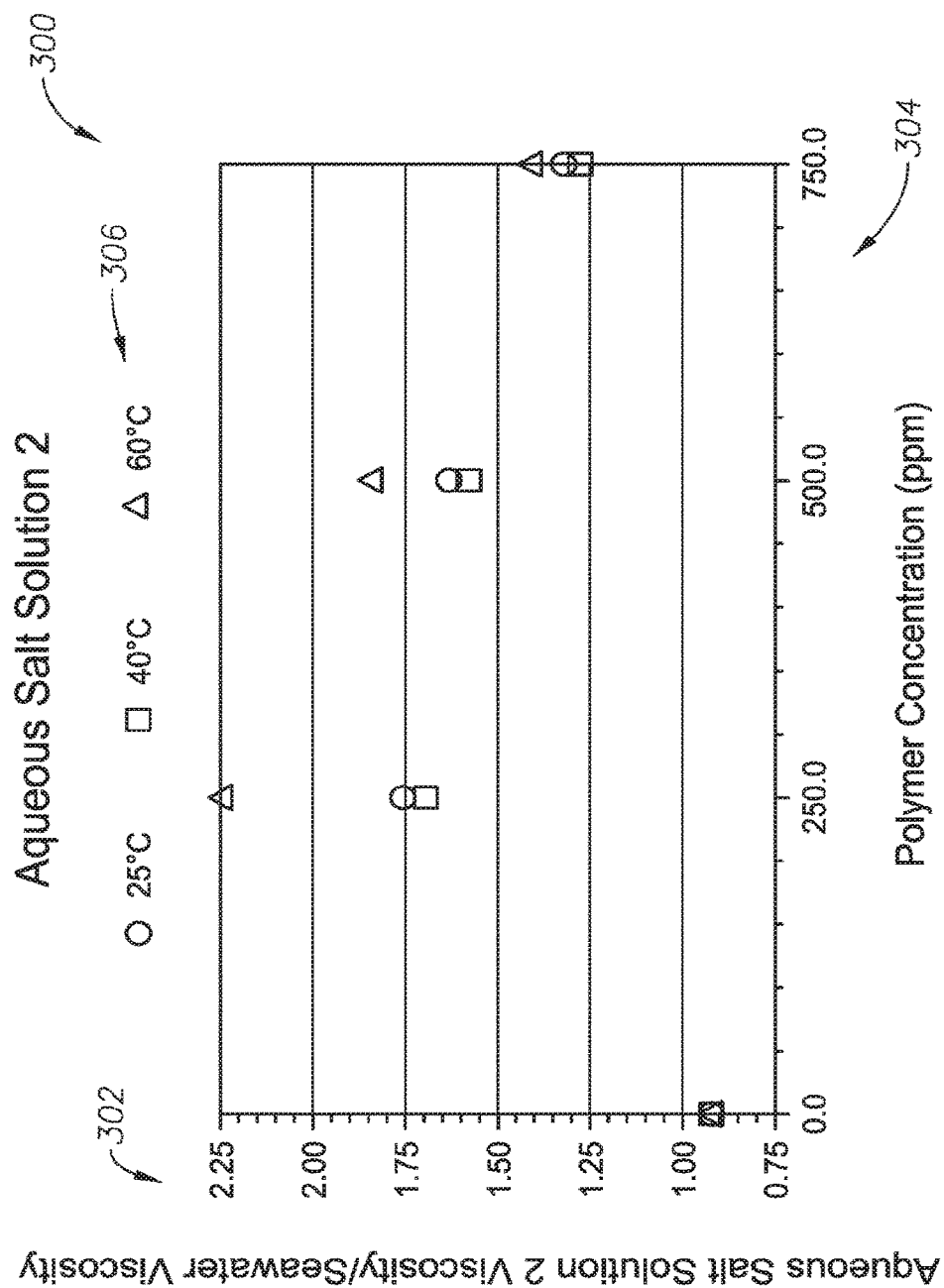
FIG. 3 is a plot of a ratio of aqueous salt solution viscosity over seawater viscosity vs polymer concentration in ppm for a second example aqueous salt solution in accordance with an embodiment of the disclosure.

Similarly, FIG. 3 depicts a plot 300 illustrating the viscosity improvements of Aqueous Salt Solution 2 as compared to seawater at the various polymer concentrations of 250 ppm, 500 ppm, 750 ppm. As shown in FIG. 3, the Y-axis 302 corresponds to the ratio of tested aqueous solution viscosity over seawater viscosity, and the X-axis 304 corresponds to the polymer concentration in ppm. As shown in the legend 306, FIG. 3 depicts data points corresponding to a polymer concentration of 250 ppm, data points corresponding to a polymer concentration of 500 ppm, and data points corresponding to polymer concentrations of 750 ppm at the three different temperatures of 25° C., 40° C. and 60° C.

As shown in Tables 1-3 and as illustrated in FIGS. 2 and 3, both tested aqueous solutions developed about 1.5 to 2.0 times greater viscosities with a 250 ppm polymer concentration and 3 to 4 times greater viscosities with 500 ppm polymer concentrations when compared to seawater alone. Moreover, the incremental viscosities observed in both tested aqueous solutions at the various polymer concentrations were about 25 to 50% greater than seawater having the various polymer concentrations.

Additionally, as shown in Tables 1-3, the incremental viscosities of Aqueous Salt Solution 2 were about 2 to 3 times greater than Aqueous Salt Solution 1 likely due to the reduced interaction of sodium ion with the AN-125 polymer due to the increased concentration of sulfates in Aqueous Salt Solution 2. Thus, as shown supra, the addition of polymer to tested aqueous solutions in dilute concentrations results in viscosities suitable for enhanced oil recovery and provides improved polymer viscosifying characteristics due to favorable interactions of both low salinity and specific ions such as sulfates present in the tested aqueous solutions.

In some embodiments, the oil recovery composition of an aqueous solution of one or more salts with a salinity of about 4,000 ppm to about 8,000 ppm (for example, 5,000 ppm to about 6,000 ppm) and dilute polymer may be suitable for light oil recovery with in situ reservoir oil viscosities of less than 10 cP. In some embodiments, the oil recovery composition of an aqueous solution of one or more salts with a salinity of about 4,000 ppm to about 8,000 ppm (for example, 5,000 ppm to about 6,000 ppm) and dilute polymer may be suitable for light oil recovery with in situ reservoir oil viscosities of less than 3 cP.

Embodiments of the disclosure may include oil recovery compositions that include an aqueous solution of one or more salts with a salinity of about 4,000 ppm to about 8,000 ppm (for example, 5,000 ppm to about 6,000 ppm). In some embodiments, an aqueous solution may include one or more salts that include but are not limited to sodium chloride (NaCl), calcium chloride ($CaCl_2$), magnesium chloride ($MgCl_2$), sodium sulfate ($Na_2SO_4$) and magnesium sulfate ($MgSO_4$). Embodiments of the disclosure may include aqueous solutions having a concentration of one or more ions that include but are not limited to sulfate ions, calcium ions, magnesium ions, and chloride ions. In some embodiments, an aqueous solution in the oil recovery composition may include dilute seawater (that is, seawater diluted to achieve a salinity of about 4,000 ppm to about 8,000 ppm). In some embodiments, the dilute seawater may include the addition of one or more salts (for example, at least one of sodium chloride (NaCl), calcium chloride ($CaCl_2$)), magnesium chloride ($MgCl_2$), sodium sulfate ($Na_2SO_4$) and magnesium sulfate ($MgSO_4$)). In some embodiments, an aqueous solution of one or more salts in the improved oil recovery composition with dilute polymer may have a salinity of about 4,000 ppm to about 8,000 ppm and may include about 400 ppm or greater sulfates and about 300 ppm or less of calcium and magnesium together.

Embodiments of the disclosure may include oil recovery compositions that include suitable anionic enhanced oil recovery polymers diluted to polymer concentrations of less than or equal to 500 ppm when combined with an aqueous solution of one or more salts to form the oil recovery compositions. These polymers may include but are not limited to polyacrylamides and copolymers of acrylamide. Such polymers may include but are not limited to partially hydrolyzed polyacrylamides (HPAM), copolymers of ATBS and acrylamide. In some embodiments, such polymers may be selected from the Flopaam AN series of polymers manufactured by SNF Floerger of Andrézieux, France.

Embodiments of the disclosure may include an oil recovery composition that includes an aqueous solution of one or more salts according to the criteria described in the disclosure and a polymer diluted to a concentration of less than or equal to 500 ppm. For example, embodiments of the disclosure may include an oil recovery composition that includes an aqueous solution of one or more salts according to the criteria described in the disclosure and a polymer diluted to a concentration of about 250 ppm to about 500 ppm, about 250 ppm to about 400 ppm, about 250 ppm to about 300 ppm. In some embodiments, as described infra, an oil recovery composition of an aqueous solution of one or more salts having a salinity of about 4,000 ppm to about 8,000 ppm (for example, 5,000 ppm to about 6,000 ppm) and dilute polymer may be used in combination with another aqueous solution of one or more salts, seawater, and other oil recovery compositions of an aqueous solution of one or more salts and dilute polymer.

In some embodiments, the oil recovery composition described in the disclosure may include metal oxide nanoparticles (that is particles having at least one dimension (for example diameter or length) in the range of 1 nanometer to 100 nanometers). In some embodiments, the metal oxide nanoparticles may include silicon dioxide ($SiO_2$), aluminum oxide ($Al_2O_3$) or both. In some embodiments, the oil recovery composition may include metal oxide nanoparticles having a concentration of up to 0.1 wt %. For example, the oil recovery composition may include metal oxide nanoparticles having a concentration of about 0.02 wt %, 0.05 wt % or less, 0.06 wt % or less, 0.07 wt % or less, 0.08 wt % or less, 0.09 wt % or less, or 0.1 wt % or less. According, in some embodiments, an oil recovery composition may include an aqueous solution of one or more salts having a salinity of about 4,000 ppm TDS to about 8,000 ppm TDS (for example, about 5,000 ppm TDS to about 6,000 ppm TDS) according to the criteria described in the disclosure, a polymer diluted to a concentration of about 250 ppm to about 500 ppm, about 250 ppm to about 400 ppm, or about 250 ppm to about 300 ppm, and metal oxide nanoparticles having a concentration of about 0.02 wt %, 0.05 wt % or less, 0.06 wt % or less, 0.07 wt % or less, 0.08 wt % or less, 0.09 wt % or less, or 0.1 wt % or less.

In some embodiments, the oil recovery composition described in the disclosure may include dissolved carbon dioxide ($CO_2$) that compliments the dilute polymer. In such embodiments, the dissolved $CO_2$ may be embedded in the oil recovery composition using known techniques before injecting or otherwise introducing the oil recovery composition into the carbonate reservoir formation. In such embodiments, an oil recovery composition may include an aqueous solution of one or more salts having a salinity of about 4,000 ppm to about 8,000 ppm (for example, 5,000 ppm to about 6,000 ppm) according to the criteria described in the disclosure, a polymer diluted to a concentration of about 250 ppm to about 500 ppm, about 250 ppm to about 400 ppm, or about 250 ppm to about 300 ppm, and dissolved $CO_2$. As will be appreciated, the solubility of the $CO_2$ in the oil recovery composition is dependent on the salinity of the aqueous solution of the oil recovery composition. In some embodiments, the $CO_2$ may be dissolved in the aqueous solution of the oil recovery composition until saturation.

Figure 4:
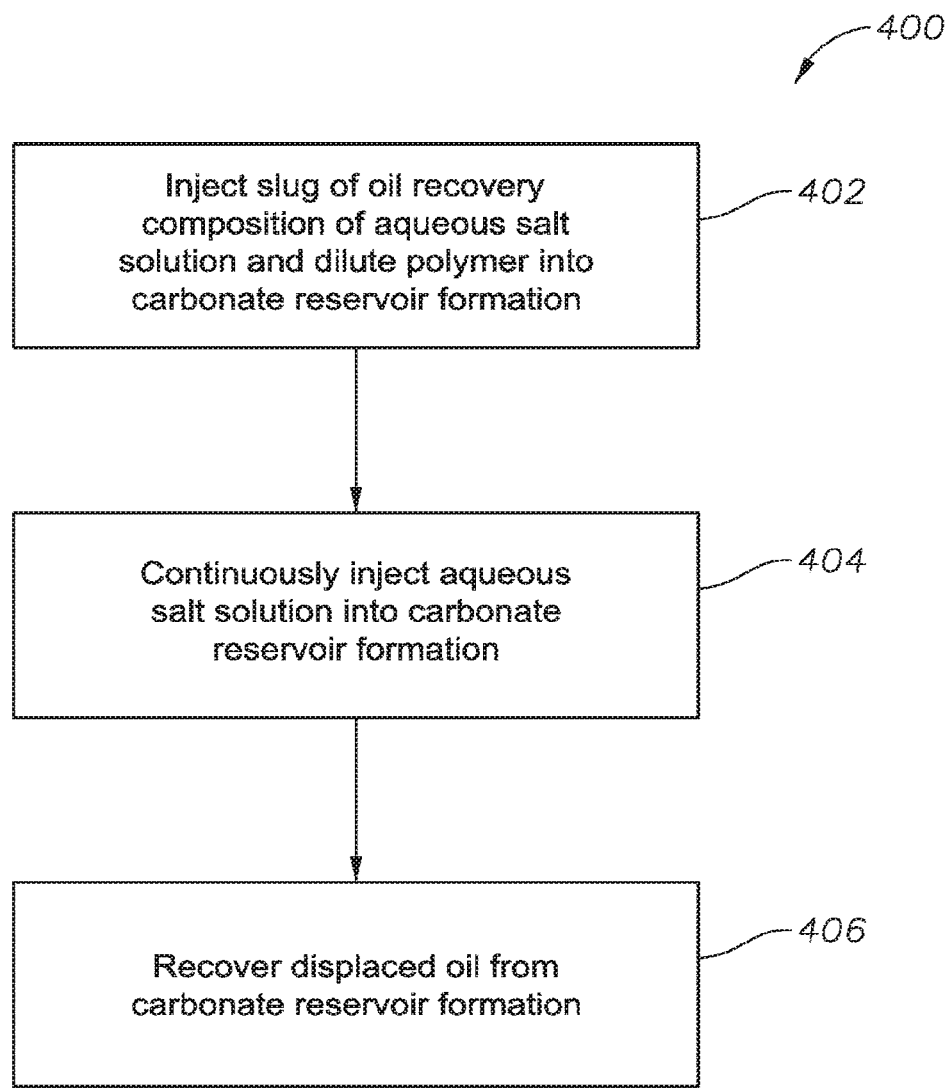
FIGS. 4-6 are flowcharts of processes for enhancing oil recovery from carbonate reservoirs using an oil recovery composition of an aqueous salt solution of one or more salts and dilute polymer in accordance with embodiments of the disclosure.
Figure 5:
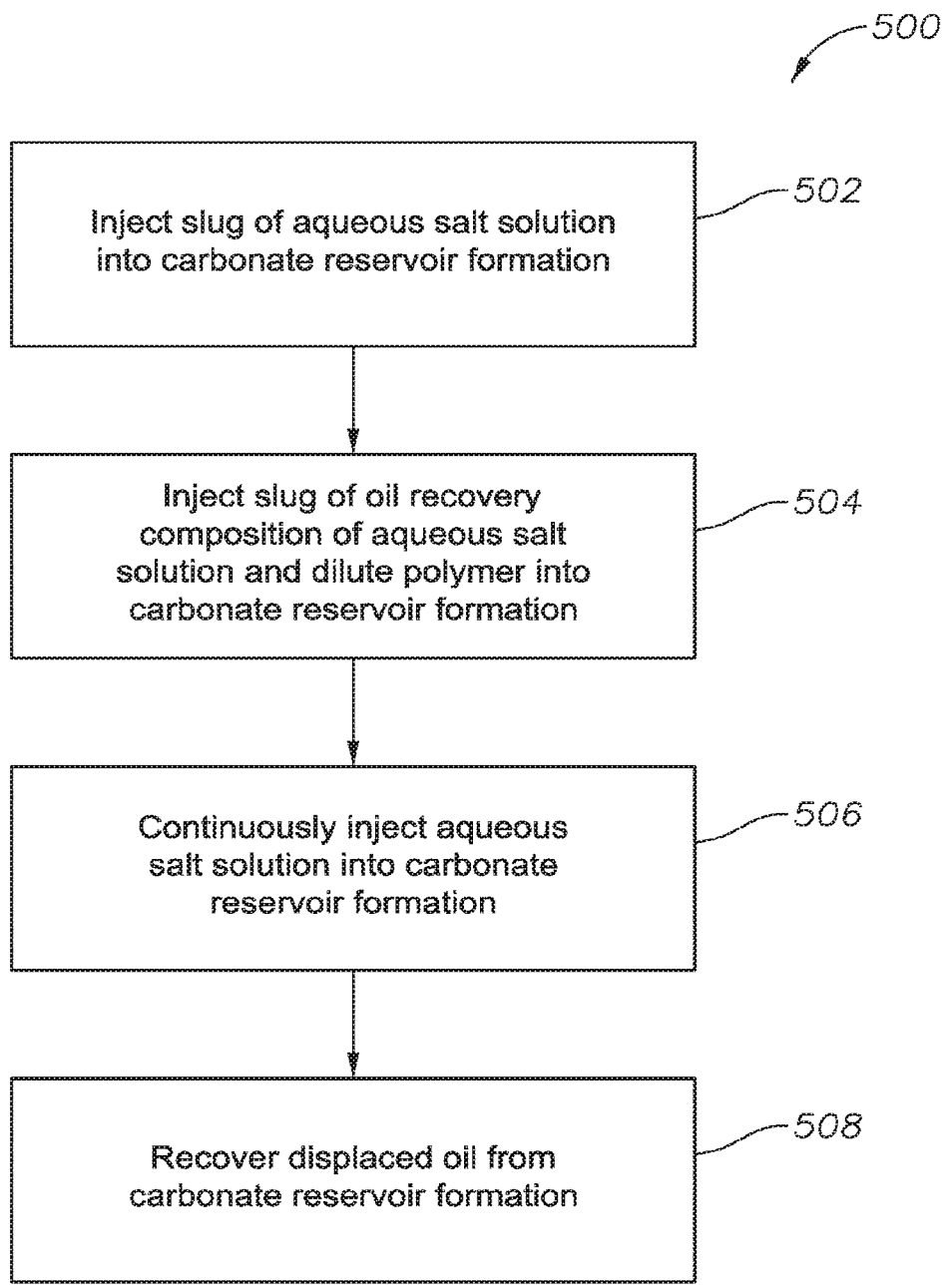
Figure 6:
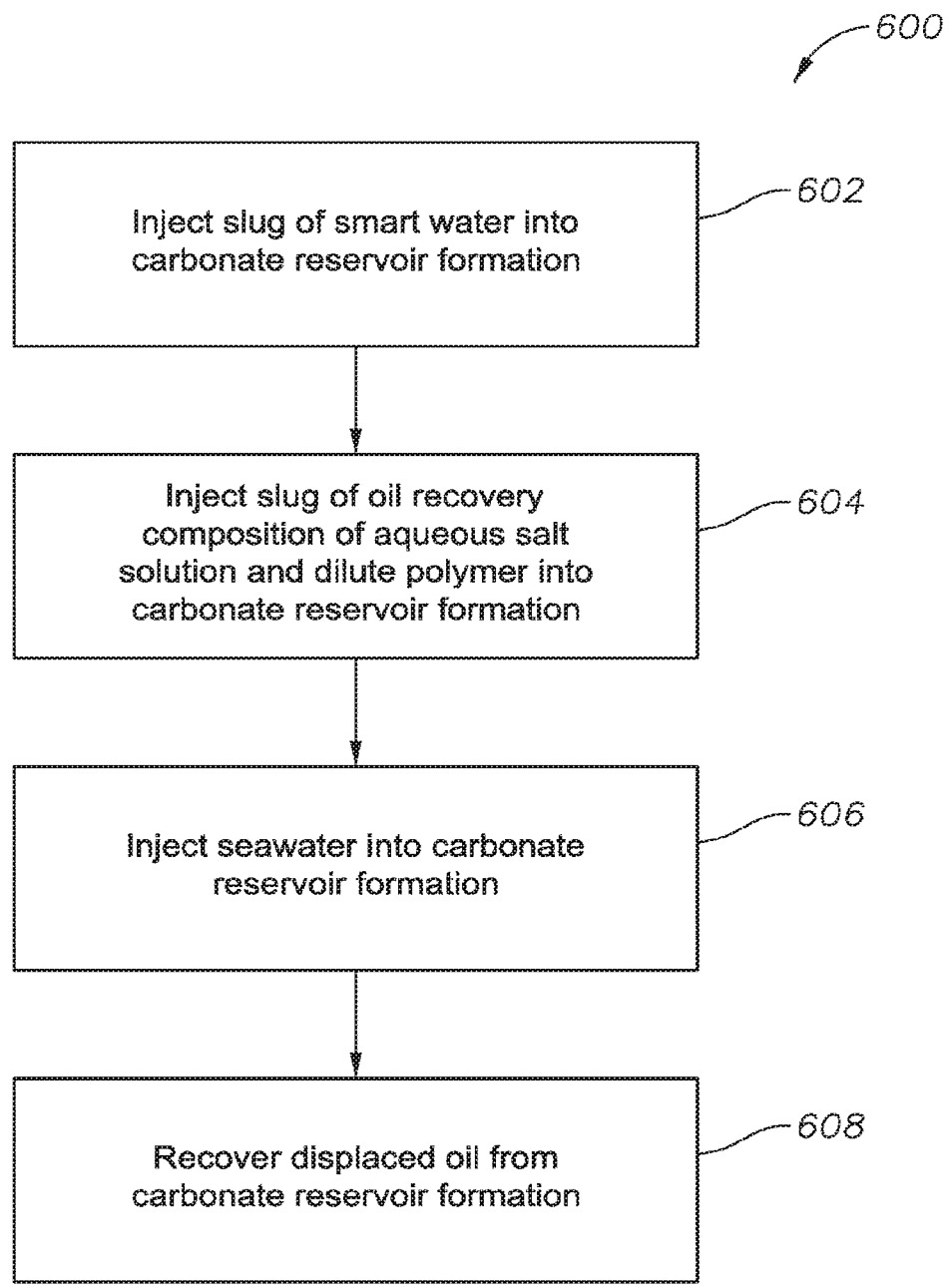

With the foregoing in mind, the oil recovery composition of an aqueous solution of one or more salts having a salinity of about 4,000 ppm to about 8,000 ppm (for example, 5,000 ppm to about 6,000 ppm) and dilute polymer may be used to enhance oil recovery from carbonate reservoirs using the example injection sequences illustrated in FIGS. 4-6 and described infra. In such embodiments, the injection of the oil recovery composition of an aqueous solution of one or more salts having a salinity of about 4,000 ppm to about 8,000 ppm (for example, 5,000 ppm to about 6,000 ppm) and dilute polymer into a hydrocarbon containing carbonate reservoir formation according to the processes described infra results in increased hydrocarbon production from the reservoir formation.

FIG. 4 depicts a process 400 for enhancing oil recovery using an oil recovery composition of an aqueous solution of one or more salts having a salinity of about 4,000 ppm to about 8,000 ppm (for example, 5,000 ppm to about 6,000 ppm) and dilute polymer in accordance with an embodiment of the disclosure. As shown in FIG. 4, in some embodiments, a slug of an oil recovery composition of an aqueous solution of one or more salts having a salinity of about 4,000 ppm to about 8,000 ppm (for example, 5,000 ppm to about 6,000 ppm) and dilute polymer may be injected or otherwise introduced into the carbonate reservoir formation (block 402). As described supra, the oil recovery composition may include an aqueous solution of one or more salts having a salinity of about 4,000 ppm to about 8,000 ppm (for example, 5,000 ppm to about 6,000 ppm) and a polymer having a concentration of less than or equal to 500 ppm. In some embodiments, the slug of an aqueous solution of one or more salts having a salinity of about 4,000 ppm to about 8,000 ppm (for example, 5,000 ppm to about 6,000 ppm) and dilute polymer may have a PV of at least 0.3 of the reservoir to be treated. Following the injection of the slug of the oil recovery composition, an aqueous solution of one or more salts having a salinity of about 4,000 ppm to about 8,000 ppm (for example, 5,000 ppm to about 6,000 ppm) may be continuously injected into the carbonate reservoir formation (block 404). The aqueous solution of one or more salts having a salinity of about 4,000 ppm to about 8,000 ppm (for example, 5,000 ppm to about 6,000 ppm) continuously injected into the reservoir may be the same aqueous solution in the oil recovery composition or may be a different aqueous solution. Finally, displaced oil may be recovered from the carbonate reservoir formation (block 406).

FIG. 5 depicts a process 500 for enhancing oil recovery from a carbonate reservoir formation using an oil recovery composition of an aqueous solution of one or more salts having a salinity of about 4,000 ppm to about 8,000 ppm (for example, 5,000 ppm to about 6,000 ppm) and dilute polymer in accordance with another embodiment of the disclosure. As shown in FIG. 5, in some embodiments, a slug of an aqueous solution of one or more salts having a salinity of about 4,000 ppm to about 8,000 ppm (for example, 5,000 ppm to about 6,000 ppm) may be injected into the carbonate reservoir (block 502). Next, a slug of an oil recovery composition of an aqueous solution of one or more salts and dilute polymer may be injected into the carbonate reservoir (block 504). As described supra, the oil recovery composition may include an aqueous solution of one or more salts having a salinity of about 4,000 ppm to about 8,000 ppm (for example, 5,000 ppm to about 6,000 ppm) and a polymer having a concentration of less than or equal to 500 ppm. In some embodiments, the slug of oil recovery composition may have a PV in the range of about 0.3 to about 0.5 of the reservoir to be treated. Following the injection of the slug of aqueous solution of one or more salts and the slug of oil recovery composition, an aqueous solution of one or more salts having a salinity of about 4,000 ppm to about 8,000 ppm (for example, 5,000 ppm to about 6,000 ppm) may be continuously injected into the carbonate reservoir (block 506). Finally, displaced oil may be recovered from the carbonate reservoir formation (block 508).

FIG. 6 depicts a process 600 for enhancing oil recovery from a carbonate reservoir formation using an oil recovery composition of an aqueous solution of one or more salts having a salinity of about 4,000 ppm to about 8,000 ppm (for example, 5,000 ppm to about 6,000 ppm) and dilute polymer in accordance with another embodiment of the disclosure. As shown in FIG. 6, in some embodiments, a slug of an aqueous solution of one or more salts having a salinity of about 4,000 ppm to about 8,000 ppm (for example, 5,000 ppm to about 6,000 ppm) may be injected into the carbonate reservoir (block 602). Next, a slug of an oil recovery composition of an aqueous solution of one or more salts having a salinity of about 4,000 ppm to about 8,000 ppm (for example, 5,000 ppm to about 6,000 ppm) and dilute polymer may be injected into the carbonate reservoir (block 604). As described supra, the oil recovery composition may include an aqueous solution of one or more salts having a salinity of about 4,000 ppm to about 8,000 ppm (for example, 5,000 ppm to about 6,000 ppm) and a polymer having a concentration of less than or equal to 500 ppm. In some embodiments, the slug of the aqueous solution and dilute polymer may have a PV in the range of about 0.3 to about 0.5 of the reservoir to be treated. Following the injection of the slug of aqueous solution and the slug of oil recovery composition, seawater may be continuously injected into the carbonate reservoir formation (block 606). Finally, displaced oil may be recovered from the carbonate reservoir formation (block 608).

Figure 7:
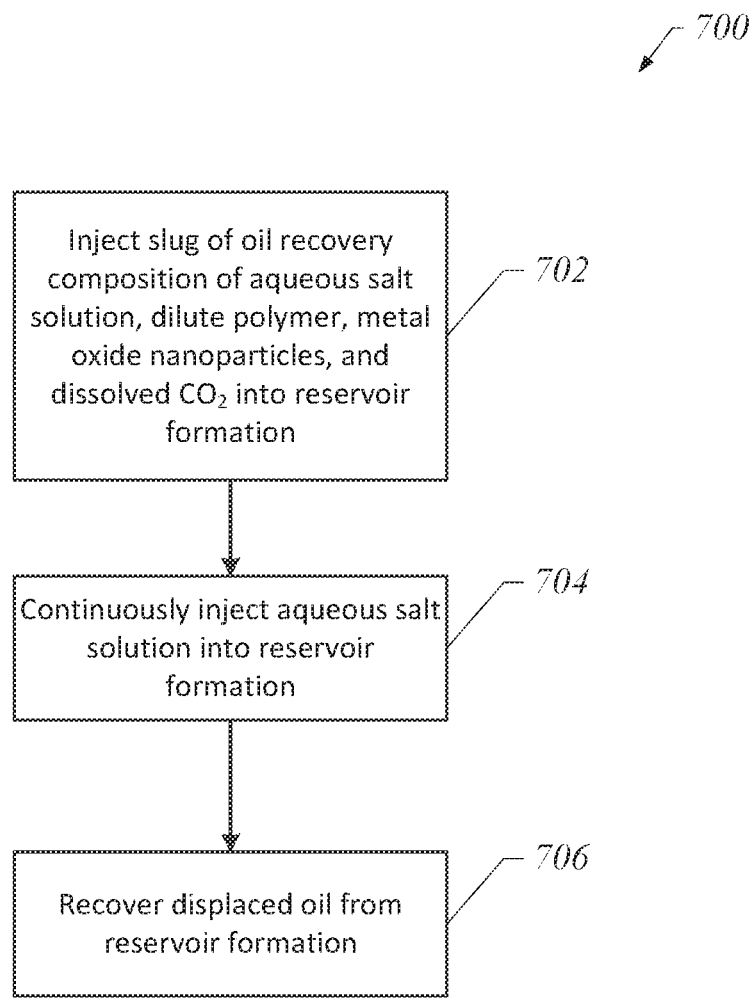
FIGS. 7-9 are flowcharts of processes for enhancing oil recovery from carbonate reservoirs using an oil recovery composition of an aqueous salt solution of one or more salts, dilute polymer, metal oxide nanoparticles, and dissolved $CO_2$ in accordance with embodiments of the disclosure.
Figure 8:
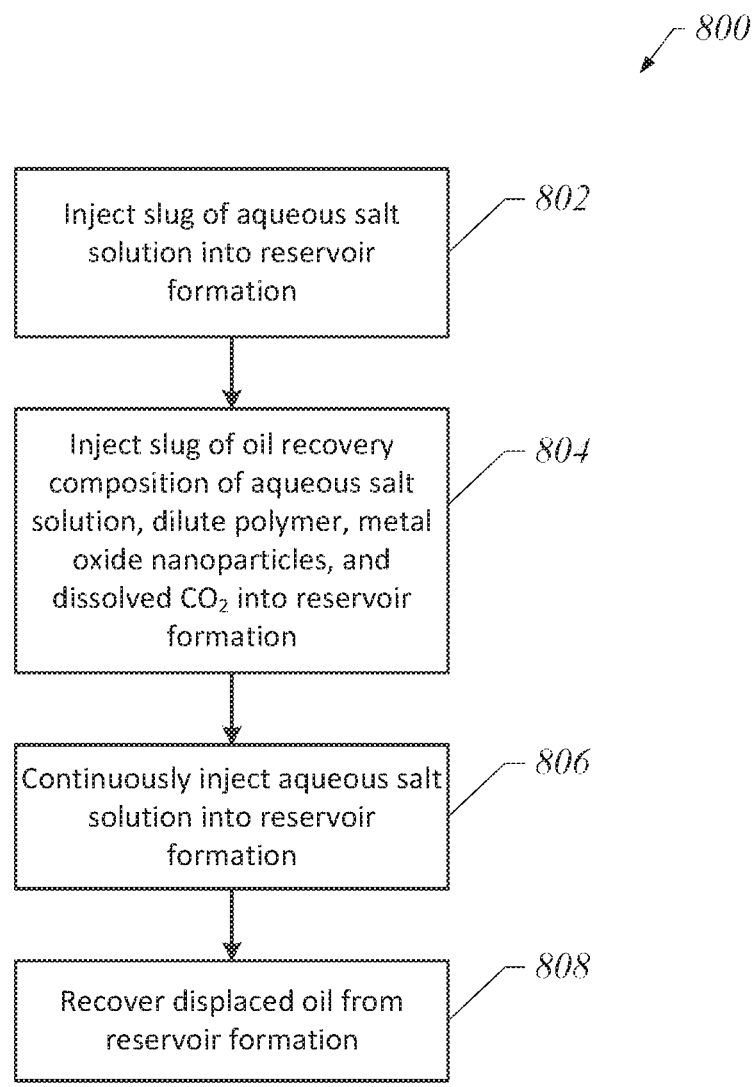
Figure 9:
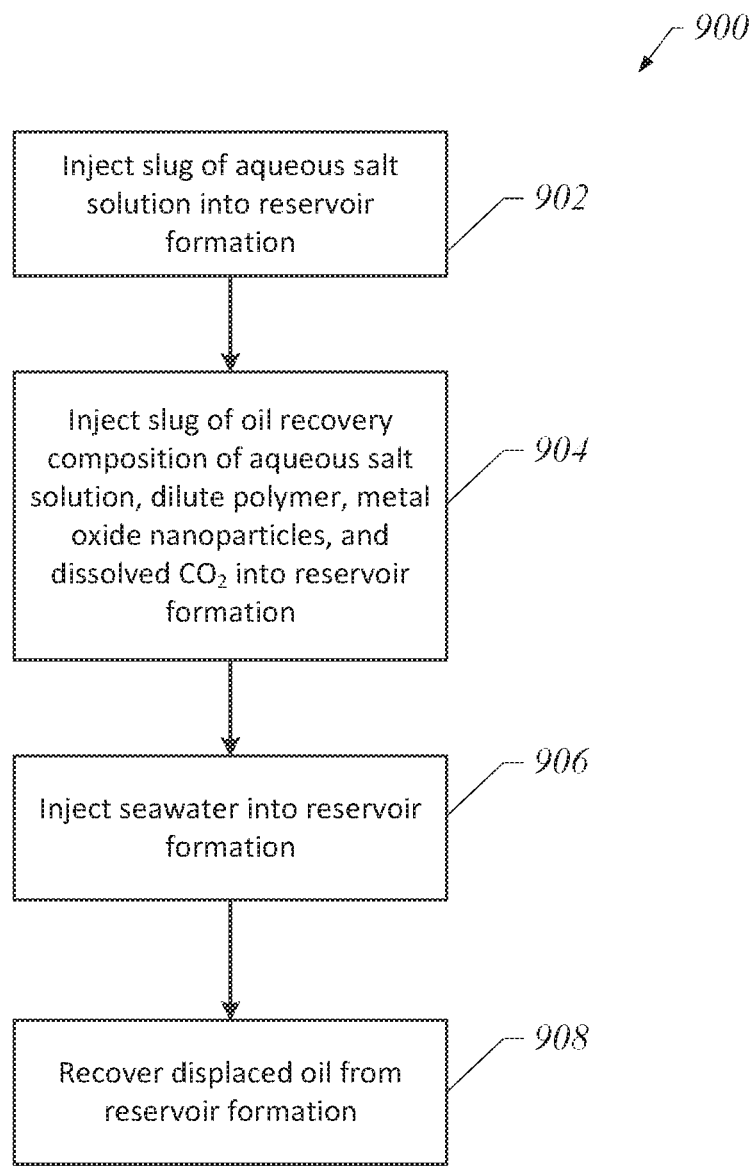

In some embodiments, an oil recovery composition of an aqueous solution of one or more salts having a salinity of about 4,000 ppm to about 8,000 ppm (for example, 5,000 ppm to about 6,000 ppm), dilute polymer, metal oxide nanoparticles, and dissolved $CO_2$ may be used to enhance oil recovery from carbonate reservoirs using the example injection sequences illustrated in FIGS. 7-9 and described infra. In such embodiments, the injection of the oil recovery composition of an aqueous solution of one or more salts having a salinity of about 4,000 ppm to about 8,000 ppm (for example, 5,000 ppm to about 6,000 ppm), dilute polymer, metal oxide nanoparticles, and dissolved $CO_2$ into a hydrocarbon containing carbonate reservoir formation according to the processes described infra results in increased hydrocarbon production from the reservoir formation.

FIG. 7 depicts a process 700 for enhancing oil recovery using an oil recovery composition of an aqueous solution of one or more salts having a salinity of about 4,000 ppm to about 8,000 ppm (for example, 5,000 ppm to about 6,000 ppm), dilute polymer, metal oxide nanoparticles, and dissolved $CO_2$ in accordance with an embodiment of the disclosure. As shown in FIG. 7, in some embodiments, a slug of an oil recovery composition of an aqueous solution of one or more salts having a salinity of about 4,000 ppm to about 8,000 ppm (for example, 5,000 ppm to about 6,000 ppm), dilute polymer, metal oxide nanoparticles, and dissolved $CO_2$ may be injected or otherwise introduced into the carbonate reservoir formation (block 702). As described supra, the oil recovery composition may include an aqueous solution of one or more salts having a salinity of about 4,000 ppm to about 8,000 ppm (for example, 5,000 ppm to about 6,000 ppm), a polymer having a concentration of greater than 0 and less than or equal to 500 ppm, metal oxide nanoparticles in a concentration of greater than 0 and less than or equal to 0.1 wt %, and dissolved $CO_2$. In some embodiments, the process 700 may include dissolving $CO_2$ in the aqueous solution to form the oil recovery composition. The $CO_2$ may be at saturation in the oil recovery composition. In some embodiments, the slug of an aqueous solution of one or more salts having a salinity of about 4,000 ppm to about 8,000 ppm (for example, 5,000 ppm to about 6,000 ppm) and dilute polymer may have a PV of at least 0.3 of the reservoir to be treated.

Following the injection of the slug of the oil recovery composition, an aqueous solution of one or more salts having a salinity of about 4,000 ppm to about 8,000 ppm (for example, 5,000 ppm to about 6,000 ppm) may be continuously injected into the carbonate reservoir formation (block 704). The aqueous solution of one or more salts having a salinity of about 4,000 ppm to about 8,000 ppm (for example, 5,000 ppm to about 6,000 ppm) continuously injected into the reservoir may be the same aqueous solution in the oil recovery composition or may be a different aqueous solution. Finally, displaced oil may be recovered from the carbonate reservoir formation (block 706).

FIG. 8 depicts a process 800 for enhancing oil recovery from a carbonate reservoir formation using an oil recovery composition of an aqueous solution of one or more salts having a salinity of about 4,000 ppm to about 8,000 ppm (for example, 5,000 ppm to about 6,000 ppm), dilute polymer, metal oxide nanoparticles, and dissolved $CO_2$ in accordance with another embodiment of the disclosure. As shown in FIG. 8, in some embodiments, a slug of an aqueous solution of one or more salts having a salinity of about 4,000 ppm to about 8,000 ppm (for example, 5,000 ppm to about 6,000 ppm) may be injected into the carbonate reservoir (block 802). Next, a slug of an oil recovery composition of an aqueous solution of one or more salts, dilute polymer, metal oxide nanoparticles, and dissolved $CO_2$ may be injected into the carbonate reservoir (block 804). As described supra, the oil recovery composition may include an aqueous solution of one or more salts having a salinity of about 4,000 ppm to about 8,000 ppm (for example, 5,000 ppm to about 6,000 ppm), a polymer having a concentration of greater than 0 and less than or equal to 500 ppm, metal oxide nanoparticles in a concentration of greater than 0 and less than or equal to 0.1 wt %, and dissolved $CO_2$. In some embodiments, the process 700 may include dissolving $CO_2$ in the aqueous solution to form the oil recovery composition. The $CO_2$ may be at saturation in the oil recovery composition. In some embodiments, the slug of oil recovery composition may have a PV in the range of about 0.3 to about 0.5 of the reservoir to be treated.

Following the injection of the slug of aqueous solution of one or more salts and the slug of oil recovery composition, an aqueous solution of one or more salts having a salinity of about 4,000 ppm to about 8,000 ppm (for example, 5,000 ppm to about 6,000 ppm) may be continuously injected into the carbonate reservoir (block 806). Finally, displaced oil may be recovered from the carbonate reservoir formation (block 808).

FIG. 9 depicts a process 900 for enhancing oil recovery from a carbonate reservoir formation using an oil recovery composition of an aqueous solution of one or more salts having a salinity of about 4,000 ppm to about 8,000 ppm (for example, 5,000 ppm to about 6,000 ppm) dilute polymer, metal oxide nanoparticles, and dissolved $CO_2$ in accordance with another embodiment of the disclosure. As shown in FIG. 9, in some embodiments, a slug of an aqueous solution of one or more salts having a salinity of about 4,000 ppm to about 8,000 ppm (for example, 5,000 ppm to about 6,000 ppm) may be injected into the carbonate reservoir (block 902). Next, a slug of an oil recovery composition of an aqueous solution of one or more salts having a salinity of about 4,000 ppm to about 8,000 ppm (for example, 5,000 ppm to about 6,000 ppm), dilute polymer, metal oxide nanoparticles, and dissolved $CO_2$ may be injected into the carbonate reservoir (block 904). As described supra, the oil recovery composition may include an aqueous solution of one or more salts having a salinity of about 4,000 ppm to about 8,000 ppm (for example, 5,000 ppm to about 6,000 ppm) a polymer having a concentration of greater than 0 and less than or equal to 500 ppm, metal oxide nanoparticles in a concentration of greater than 0 and less than or equal to 0.1 wt %, and dissolved $CO_2$. In some embodiments, the slug of the aqueous solution and dilute polymer may have a PV in the range of about 0.3 to about 0.5 of the reservoir to be treated. Following the injection of the slug of aqueous solution and the slug of oil recovery composition, seawater may be continuously injected into the carbonate reservoir formation (block 906). Finally, displaced oil may be recovered from the carbonate reservoir formation (block 908).

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Changes may be made in the elements described in the disclosure without departing from the spirit and scope of the disclosure as described in the following claims. Headings used in the disclosure are for organizational purposes only and are not meant to be used to limit the scope of the description.

Ranges may be expressed in the disclosure as from about one particular value, to about another particular value or both. When such a range is expressed, it is to be understood that another embodiment is from the one particular value, to the other particular value, or both, along with all combinations within said range.

What is claimed is:

1. A method for enhancing oil recovery in a hydrocarbon containing carbonate reservoir formation, comprising:
   injecting a slug of an oil recovery composition into the carbonate reservoir formation,
   injecting a second solution into the carbonate reservoir formation after injecting the slug of the oil recovery composition, the oil recovery composition comprising:
      an aqueous solution of one or more salts having a salinity in the range of 4000 parts-per-million (ppm) total dissolved solids (TDS) to 8000 ppm TDS, the one or more salts comprising at least one of: sodium chloride (NaCl), calcium chloride (CaCl2), magnesium chloride (MgCl2), sodium sulfate (Na2SO4) and magnesium sulfate (MgSO4), the aqueous solution comprising at least 400 ppm sulfate ions and 300 ppm or less divalent cations, the divalent cations comprising calcium, magnesium, or a combination thereof;
      a polymer having a concentration in the range of 250 ppm to less than 500 ppm;
      a plurality of metal oxide nanoparticles having a concentration in the range of 0.5 weight (wt) % to 0.1 wt %; and
      dissolved carbon dioxide ($CO_2$) in the aqueous solution.

2. The method of claim 1, wherein the oil recovery composition consists of:
   the aqueous solution of one or more salts having a salinity in the range of 4000 parts-per-million (ppm) total dissolved solids (TDS) to 8000 ppm TDS, the one or more salts comprising at least one of: sodium chloride (NaCl), calcium chloride (CaCl2), magnesium chloride (MgCl2), sodium sulfate (Na2SO4) and magnesium sulfate (MgSO4); and
   the polymer having a concentration in the range of 250 ppm to less than-500 ppm;
   a plurality of metal oxide nanoparticles having a concentration in the range of 0.5 weight (wt) % to 0.1 wt %; and
   dissolved carbon dioxide in the aqueous solution.

3. The method of claim 1, wherein the metal oxide nanoparticles comprise silicon dioxide, aluminum oxide, or a combination thereof.

4. The method of claim 1, comprising recovering displaced hydrocarbon from the carbonate reservoir formation.

5. The method of claim 1, wherein the aqueous solution comprises one or more ions, the one or more ions comprising at least one of: calcium, magnesium, and sulfate.

6. The method of claim 1, wherein the slug of the oil recovery composition has a pore volume (PV) of at least 0.3 of the carbonate reservoir formation.

7. The method of claim 1, wherein the second solution comprises seawater.

8. The method of claim 1, wherein the second solution comprises the aqueous solution.

9. The method of claim 1, wherein the aqueous solution is a first aqueous solution the one or more salts are first one or more salts, and the second solution comprises a second aqueous solution of one or more second salts suitable for enhancing oil recovery from the carbonate reservoir formation.

10. The method of claim 1, wherein the polymer comprises a copolymer of acrylamide and acrylamido tertiary butyl sulfonate (ATBS).

11. The method of claim 1, wherein injecting a second solution into the carbonate reservoir formation comprises continuously injecting the second solution at an injection rate.

12. The method of claim 1, wherein the carbonate reservoir formation has an in situ oil viscosity of less than 3 centipoise.

* * * * *